United States Patent [19]
Ahmed

[11] Patent Number: 5,418,624
[45] Date of Patent: May 23, 1995

[54] NEGOTIATION METHOD AND APPARATUS ENABLING A FACSIMILE MACHINE TO USE ASYNC DATA COMMUNICATION PROTOCOLS

[75] Inventor: Allam Z. Ahmed, Santa Clara County, Calif.

[73] Assignees: Ricoh Co., Ltd., Tokyo, Japan; Ricoh Corporation, San Jose, Calif.

[21] Appl. No.: 939,612

[22] Filed: Sep. 2, 1992

[51] Int. Cl.⁶ .......................... H04N 1/32; H04N 1/333
[52] U.S. Cl. ..................................... 358/435; 358/405; 358/436
[58] Field of Search ............... 358/405, 434, 435, 436, 358/438, 439

[56] References Cited

U.S. PATENT DOCUMENTS

4,807,276  2/1989  Okabe ..................................... 379/93
5,173,786  12/1992  Nakagawa ........................... 358/405

*Primary Examiner*—Bentsu Ro
*Attorney, Agent, or Firm*—Flehr, Hohbach, Test, Albritton & Herbert

[57] ABSTRACT

A facsimile machine is provided which can transmit and receive data over asynchronous digital data networks in accordance with an asynchronous protocol. The facsimile machine can provide and receive negotiation information during a data transmission process.

58 Claims, 13 Drawing Sheets

(PRIOR ART)
FIG.—1

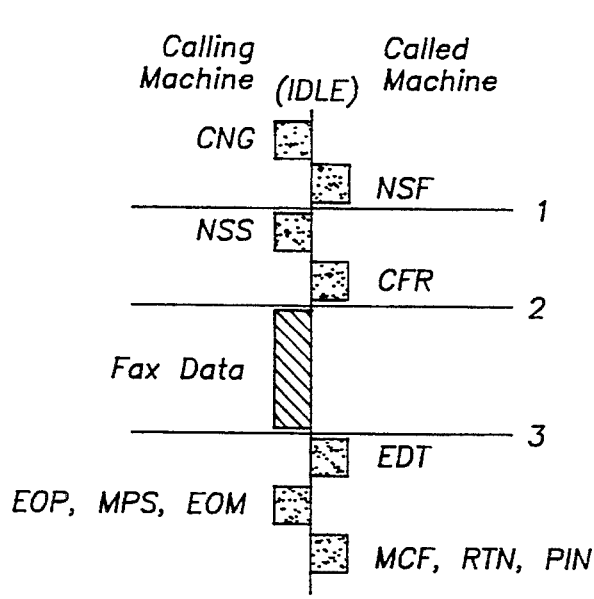
(PRIOR ART)
FIG.−3A
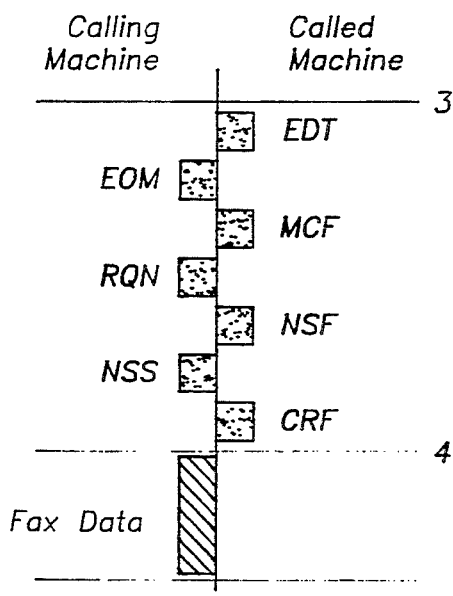
(PRIOR ART)
FIG.−3B
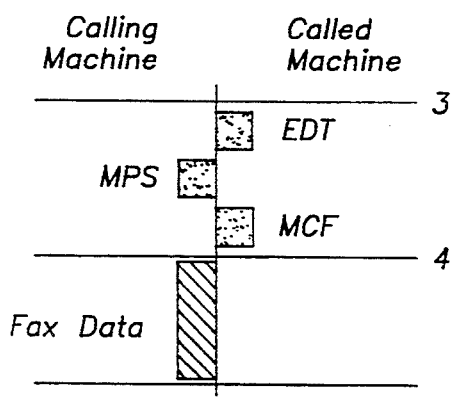
(PRIOR ART)
FIG.−3C
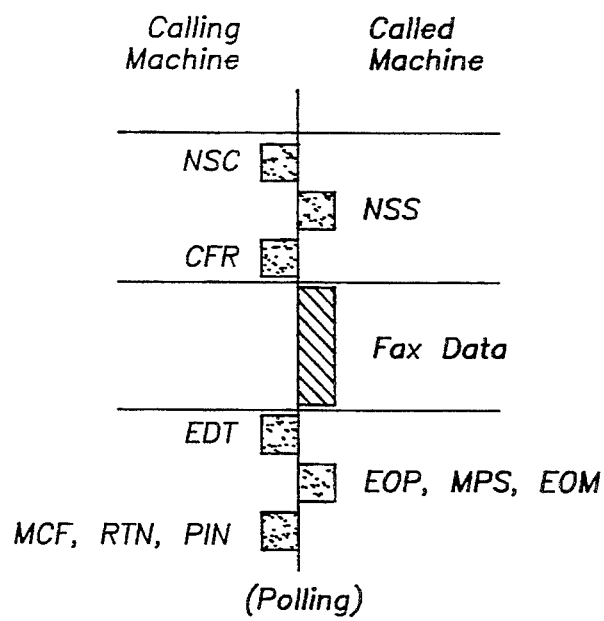
(PRIOR ART)
FIG.−3D

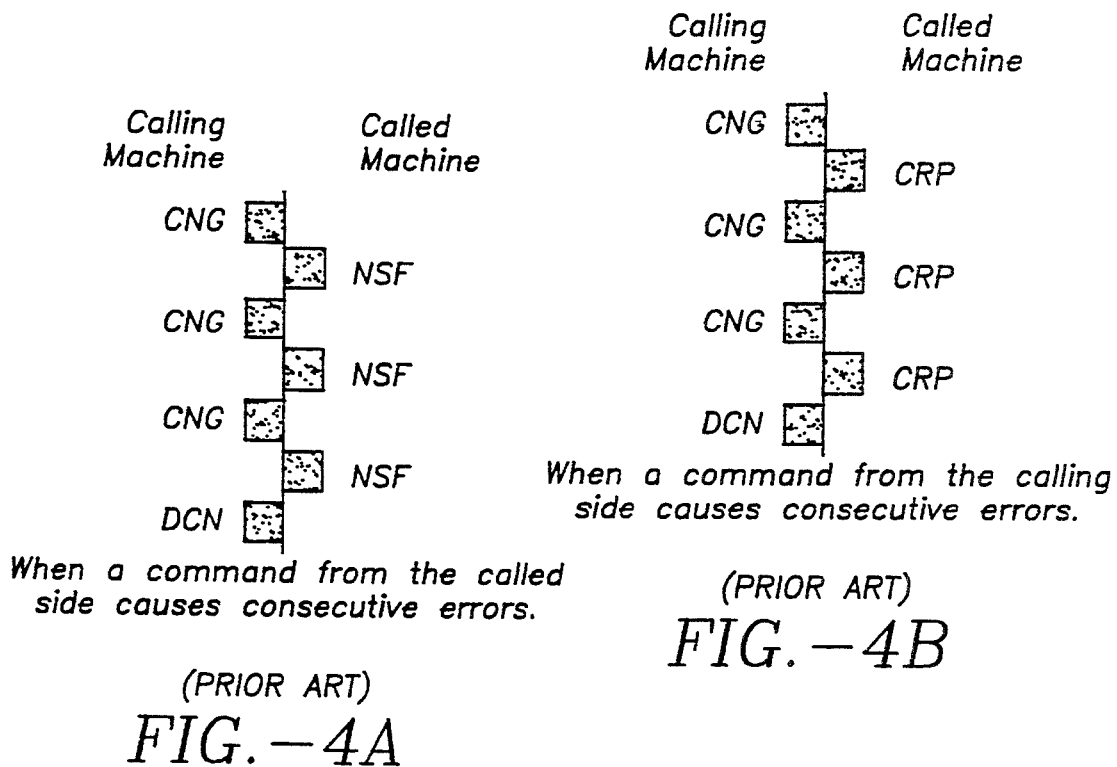
FIG.–4A (PRIOR ART)
FIG.–4B (PRIOR ART)
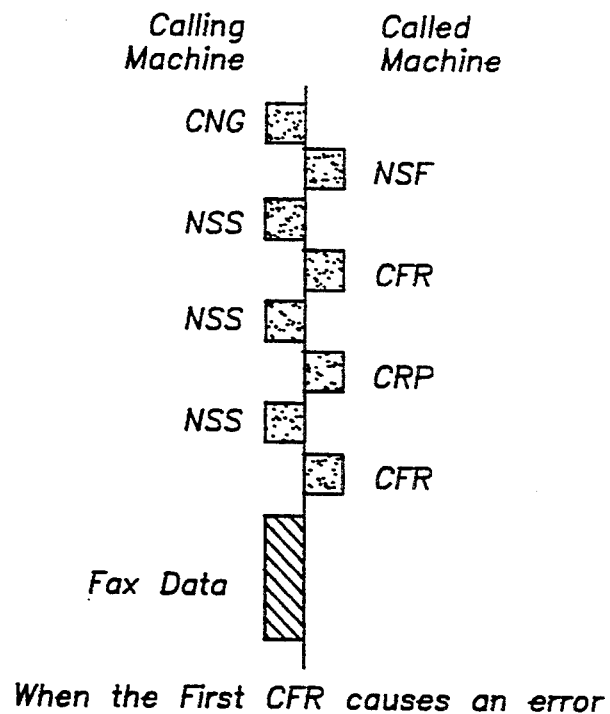
FIG.–4C (PRIOR ART)

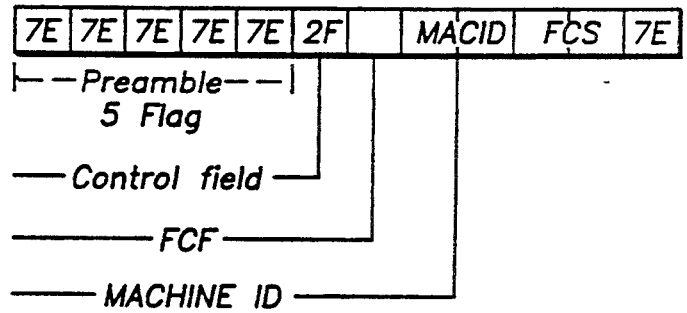
FIG.—5A
(PRIOR ART)
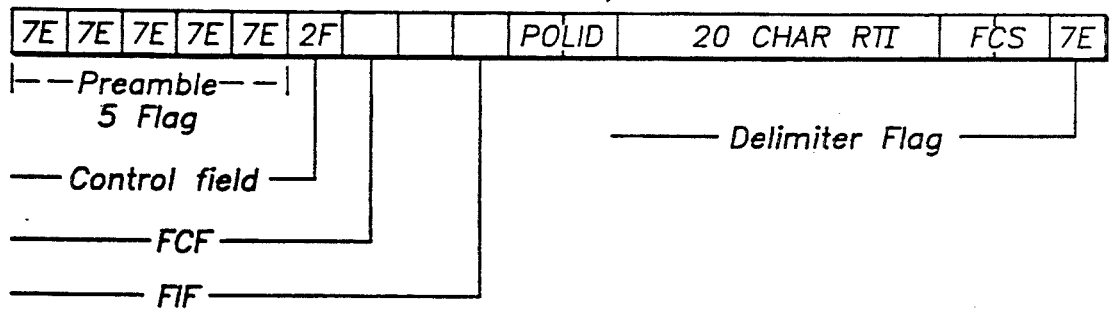
FIG.—5B
(PRIOR ART)
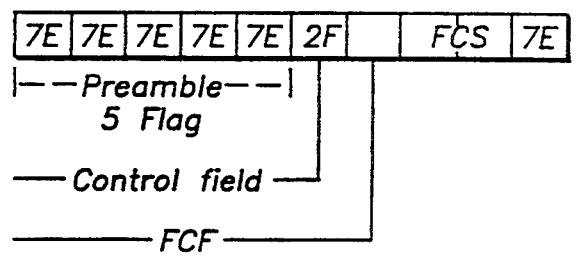
FIG.—5C
(PRIOR ART)

The Content of FIF (Facsimile Information Field)

*Fine Res=1 (NSF, NSS, NSC)

Density (NSF*, NSS*, NSC*) [DTL=1, STD=0]

Paper Size (NSF*, NSC*)

*MMR = 1 (NSF*, NSS*, NSC*)

Waiting to be Polled (NSF*)

Coding Method (NSF*, NSS*, NSC*) [MR=1, MH=0]

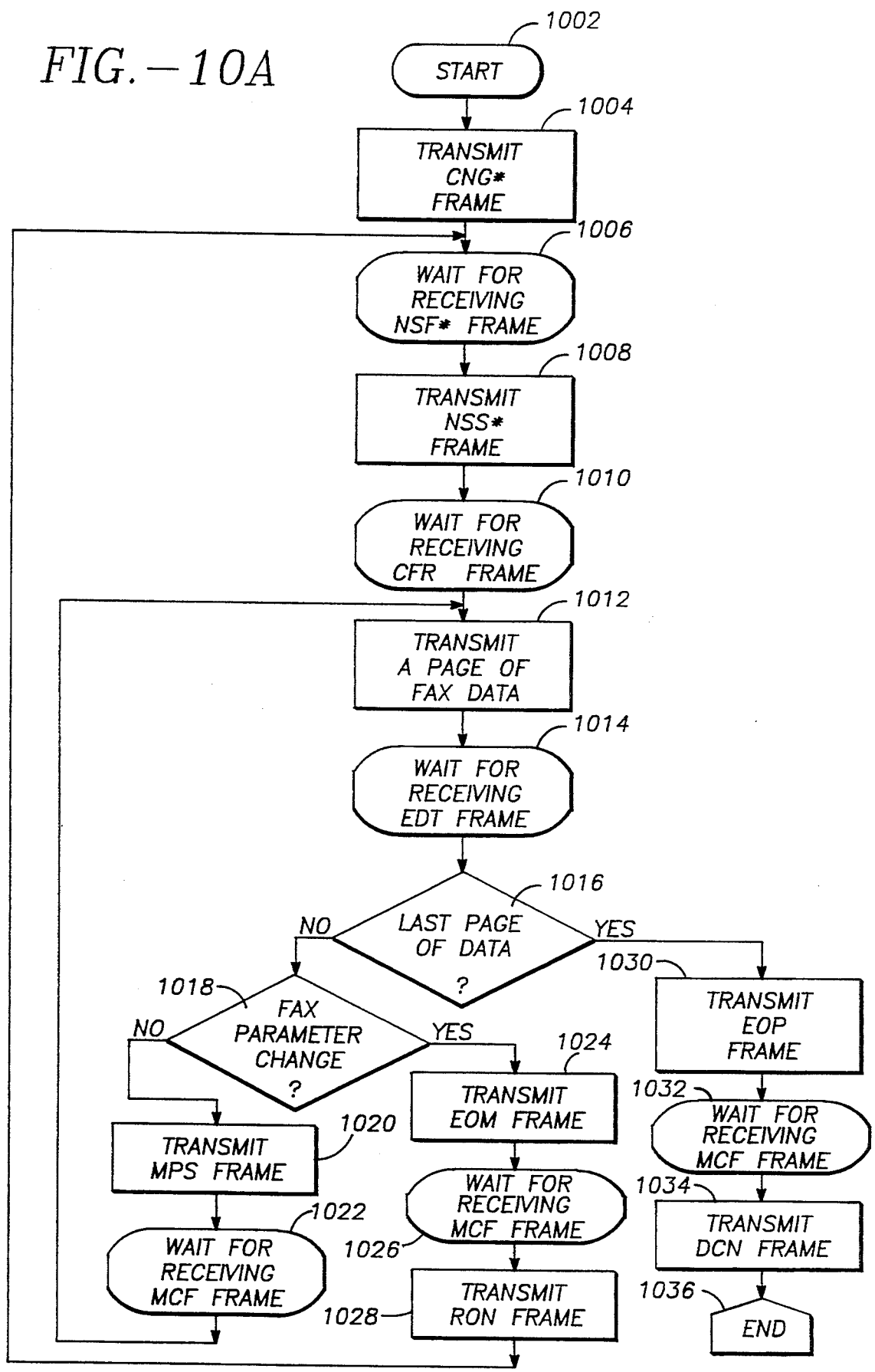
FIG.—10A

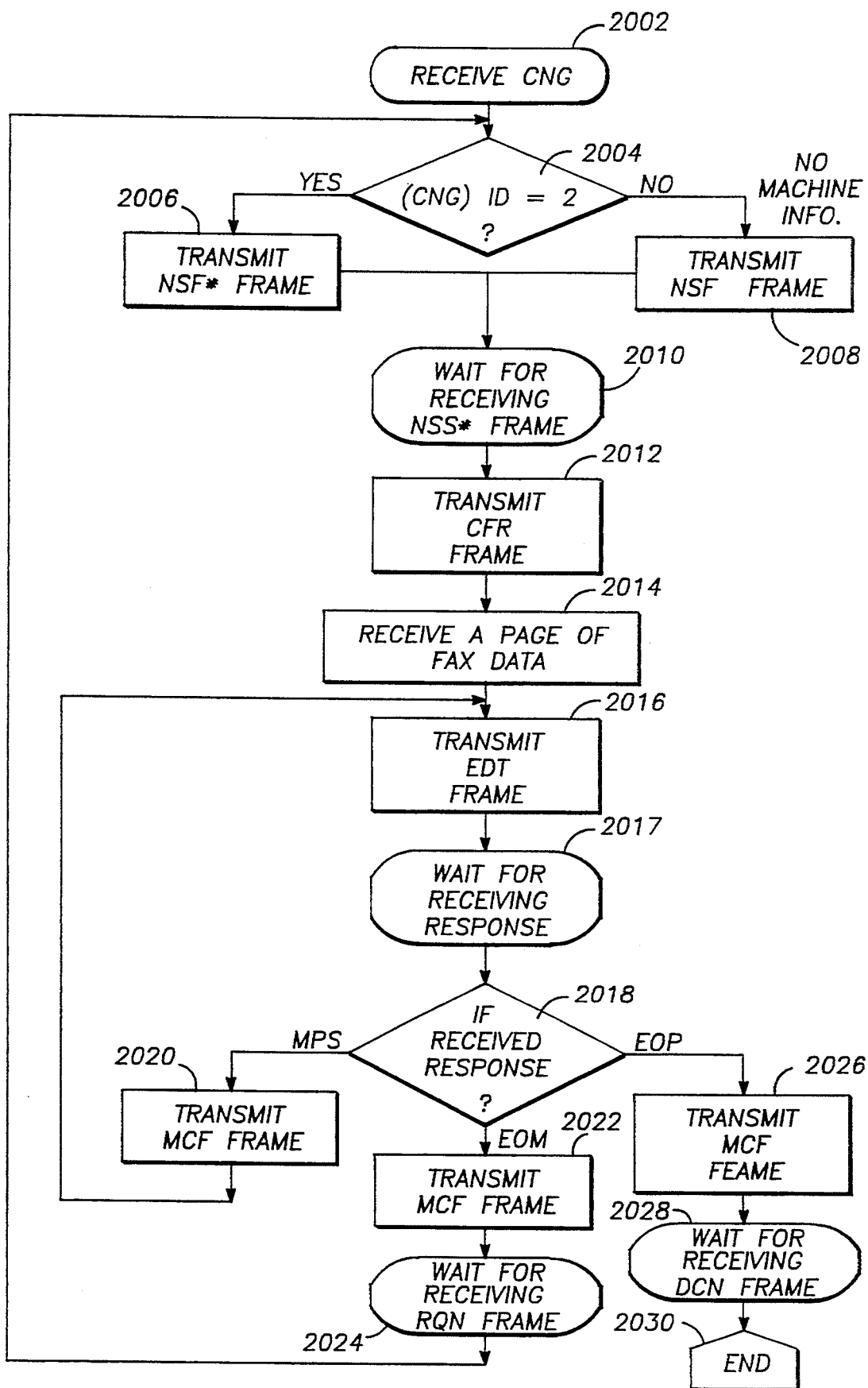
FIG.—10B

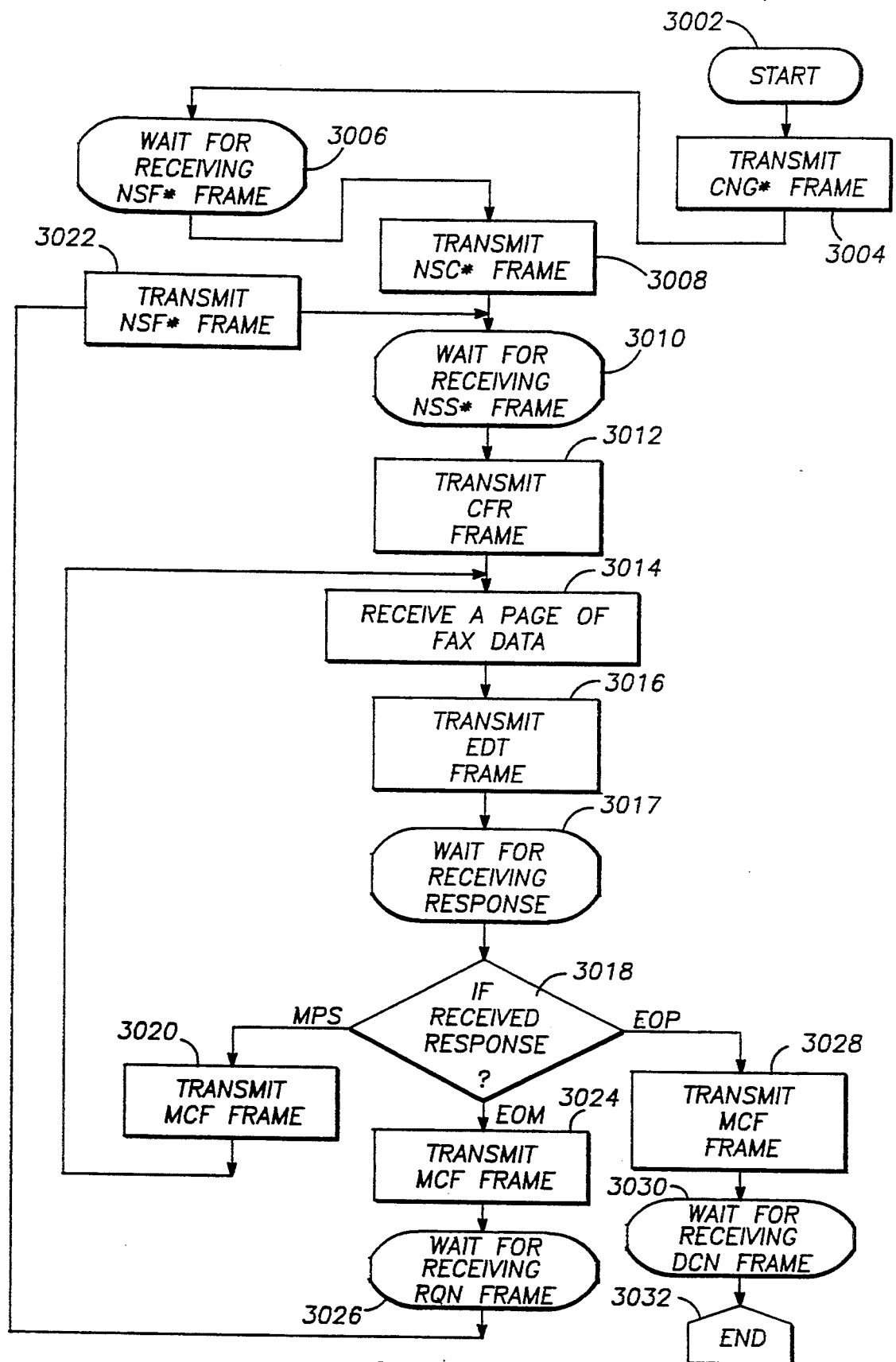
FIG.—11A

NEGOTIATION METHOD AND APPARATUS ENABLING A FACSIMILE MACHINE TO USE ASYNC DATA COMMUNICATION PROTOCOLS

FIELD OF THE INVENTION

This invention relates generally to facsimile machines, and more particularly to facsimile machines for use with asynchronous data communication protocols.

BACKGROUND OF THE INVENTION

Facsimile machines (or FAX) were initially designed to transmit and receive data over the Public Switched Telephone Network (PSTN) analog system in accordance with standardized data communication protocols. Frequently used data communication protocols include Group 1 (G1), Group 2 (G2) and Group 3 (G3).

In the PSTN system, these three protocols are traditionally used in a synchronized fashion, where the time interval between image data and command, or the time interval between two commands is pre-determined by the protocols.

FIG. 1 depicts a typical G3 multi-page fax data communication process having changes of image parameters in a normal operation mode over the PSTN system. In FIG. 1, CED stands for Called Station Identification, NSF stands for Non-Standard Facilities, CSI stands for Called Subscriber Identification, DIS stands for Digital Identification Signals, DCS stands for Digital Command Signals, TSI stands for Transmitting Subscriber Identification, CFR stands for Confirmation to Receive, EOM stands for End of Message, MCF stands for Message Confirmation, EOP stands for End of Procedure, and DCN stands for Disconnect Signal.

In FIG. 1, the blocks at the left hand (calling) side represent a sequence of events performed by a calling machine, while the blocks at the right hand (called) side represent a sequence of events performed by a called machine. This principle also applies to FIGS. 2, 3A, 3B, 3C, 3D, 4A, 4B and 4C.

With reference to FIG. 1, the communication process is initiated by a telephone call from the calling machine. After acknowledging a valid call, the called machine responds with a Non-Standard Facilities (NSF) frame. The calling machine then responds with the Non-Standard Setup (NSS) frame, advising the called machine of the resolution and compression for a page of fax data, or a frame of fax data, to follow. If an NSS frame is not received within 3 seconds, the called machine re-transmits the NSF frame. A maximum of three NSF tries is attempted before the calling machine signals a failure. On the other hand, once the NSS frame is received, the called machine transmits a Confirmation to Receive (CFR) frame. The calling machine then starts to transmit the fax data page. At the end of the transmission of the fax data page, the calling machine, which is a transmitter, typically transmits an End of Message (EOM) frame within 3.5 seconds. The EOM frame indicates that the calling machine will transmit an additional page of fax data with change of parameters to follow. If the additional page of fax data are to be transmitted without change of parameters, an Multi-Page Signal (MPS) frame is transmitted. If there are no more pages of fax data, an End Of Procedure (EOP) frame is transmitted.

With further reference to FIG. 1, after receiving the EOM frame the called machine responds with an Message Confirmation (MCF) frame and transmits an NSF frame to the calling machine within 6 seconds. After receiving both the MCF and NSF frames, the calling machine responds to the called machine by transmitting an NSS frame, informing the called machine of the new parameters for the forthcoming fax data page. The called machine confirms with a CFR frame. The calling machine then transmits the additional page of fax data. At the end of the data transmission, the calling machine transmits an EOP frame, signalling no more image data to transmit. The called machine then returns an MCF frame. Finally, the calling machine transmits the Disconnect (DCN) frame, and the transaction is terminated. As depicted in FIG. 1, the maximum time allowed between two command frames is 6 seconds.

It should be noted that the time schedule in FIG. 1 is exemplary only, since the actual sequence of events and timings varies during each specific facsimile call setup. The actual sequence of events and timings during image data communication also varies with ranges and options specified by the CCITT (International Telegraph and Telephone Consultative Committee).

Even though the synchronized G3 protocol facilitates facsimile data communication over the PSTN system, it does not permit data communication over asynchronous digital data networks. Asynchronous communication is thwarted because the time interval between two command frames, or between a command frame and a data frame, is pre-determined by the G3 protocol.

Specifically, the G3 protocol assumes that, after the transmitting side transmits one page of fax data, the receiving side will process the page of fax data in First In First Out (FIFO) order, within a pre-determined period of time (typically 3 seconds).

As shown in FIG. 1, when a page of fax data has been send by a G3 transmitting facsimile machine in the PSTN system, an EOM (End of Message) command is send out 3.5 seconds later. A post message transmission, such as MCF, is then initiated. In the G3 protocol, a RTC (Return To Control) sequence including six EOLs (End Of Lines) is embedded at the end of a page fax data. Consequently, the G3 transmitting facsimile machine typically transmits the EOM command with the assumption that the receiving side has completed processing received the page of fax data, and detected the RTC within 3.5 seconds.

However, in asynchronous digital data networks (such as a closed telephone network using leased lines), delays caused by buffering and multiplexing hardware in the asynchronous digital networks are often found. Thus, it can not be assumed that the receiving side can complete processing a page of received fax data and the RTC within the pre-determined period of time.

Also, in the PSTN system, after the transmitting side has sent out a command frame, the G3 protocol assumes that the receiving side can respond to the command frame within a pre-determined period of time. If the receiving side fails to respond to the command frame within the pre-determined period of time, the transmitting side typically performs a retry of the command frame.

Further, in G3 protocol, it is possible for either transmitting side or receiving side to send two consecutive command frames with an assumption that the maximum time for processing the preceding command frame will not exceed a predetermined period of time. For example, the receiver side consecutively generates MCF and NSF command frames within ±6 seconds between these two command frames. Without a mechanism to provide positive acknowledgement between calling and called machines, the time period between the two consecutive commands has to be assumed, as in PSTN.

But, in the asynchronous digital data networks, it cannot be assumed that the receiving side can respond to a transmitted command frame within a predetermined period of time. As noted, no such assumption is warranted due to the delays caused by the asynchronous digital data network hardware.

To adapt facsimile machines to the asynchronous digital data networks, Ricoh Corporation developed an asynchronous facsimile protocol, which is denoted Ricoh IDI (Image Data Interchange) FAX R-2100 protocol (referred as IDI protocol hereinafter). The IDI protocol achieves compatibility with a large number of existing asynchronous digital data networks while retaining the features and conventions of the widely accepted G3 facsimile terminals.

The IDI protocol successfully adds a mechanism to the G3 protocol to compensate for the delays caused by hardware in the asynchronous digital data network, e.g. buffering and multiplexing hardware. To adapt the IDI protocol, Ricoh Corporation also developed a model of facsimile machines (called R-2100 facsimile machines). The IDI protocol successfully connects R-2100 facsimile machines to the asynchronous digital data networks.

"Negotiation" refers to a bilateral information exchange between a calling facsimile machine and a called facsimile machine. A typical facsimile image may include the information that defines various image parameters, such as data compression technique, resolution, tolerance, scan line length, scanning direction, scanned line transmission time, contrast levels, etc.

Specifically, the G1, G2 and G3 protocols provide low, medium and high resolutions (or scanning densities). The low resolution provides 3.85 lines per mm (vertical) by 864 picture elements along the horizontal scan line (or 100 by 100 lines per inch). The medium resolution provides 3.85 lines per mm (vertical) by 1728 picture elements along the horizontal scan line (or 100 by 200 lines per inch). The high resolution provides 7.7 lines per mm (vertical) by 1728 picture elements along the horizontal scan line (or 200 by 200 lines per inch).

The G3 protocol further provides two coding schemes both an one-dimension coding scheme, and a two-dimension coding scheme. The one-dimension coding scheme is essentially Modified run-length Huffman Code (MH), while the two-dimension coding scheme is essentially Modified Relative Element Address Designate (READ) Code (MR).

A typical facsimile machine may have limited capabilities to adapt to specific configurations of these parameters. Thus, a negotiation process can be used to determine parameters suitable to the capabilities for both the calling facsimile and called facsimile machines, thus facilitating fax data transmission.

Unfortunately, IDI protocol does not provide a mechanism to perform such negotiation. As a result, even though R-2100 model facsimile machines can efficiently communicate with each other over the asynchronous digital data network in accordance with IDI protocol, they lack negotiation capability.

As a result, under the IDI protocol, the transmitter operates as a master, driving the receiver to accept the resolution and compression technique set at the transmitting side. The Non-Standard Setup Frame (NSS) transmitted by the transmitter commands the receiver regarding the resolution and compression to be utilized in the subsequent transmitted fax data. The receiver accordingly adjusts itself to accept the fax data.

Initially when IDI protocol was first developed, lack of negotiation capability did not cause problems because Ricoh Corporation was the only manufacturer to produce asynchronous protocol adaptable facsimile machines (R-2100 facsimile machines). When only one model of asynchronous protocol adaptable facsimile machines is available in the market, these facsimile machines can properly communicate with each other, even without negotiation capability. Subsequently Ricoh Corporation produced (and continues to produce) new models of facsimile machines that can adapt the asynchronous facsimile protocol. Other manufacturers have followed Ricoh Corporation's asynchronous facsimile protocol, and have also produced facsimile machines that adapt to the asynchronous facsimile protocol. Without negotiation capability, facsimile machines will encounter problems when communicating with facsimile machines of different models.

Further, newer facsimile protocols, such as Group 4 (G4) protocol, have more features than G1, G2 and G3 protocol. Without negotiation capability, it is very difficult to incorporate desirable new features into asynchronous facsimile protocols.

Thus, there is a need to provide facsimile machines with negotiation capability, and to provide an associated method, that adapts to an asynchronous facsimile protocol. This invention provides such facsimile machines and method, and also provides a respective method corresponding to the system in the first aspect.

SUMMARY OF THE INVENTION

In a first respect, the invention provides a novel communication system which includes a calling apparatus and a called apparatus for transmitting data therebetween over an asynchronous digital network during a transmitting process in accordance with a protocol standard. The calling apparatus and the called apparatus generate a plurality of command frames and at least one data frame during the transmitting process. The command and data frames generated by the calling apparatus have a one-to-one correspondence to the command and data frames generated by said called apparatus.

The system comprises means for exchanging negotiation information contained in a plurality of command frames between the calling apparatus and the called apparatus; means for confirming reception of said command frames; means for transmitting and receiving said at least one data frame according to said negotiation information; and means for confirming reception of each said at least one data frame.

According to the system of this invention, the calling apparatus and the called apparatus can perform negotiation via the asynchronous digital data network during a data transmission process.

This invention also provides a respective method corresponding to the system described in the first aspect.

In a second aspect, this invention provides a novel facsimile machine for transmitting and receiving data over an asynchronous digital data network during a data transmitting process in accordance with a protocol standard. The facsimile machine includes means for transmitting calling negotiation information to a called facsimile machine; means for receiving called negotiation information from said called facsimile machine;

means for decoding said called negotiation information; and means for performing the data transmitting process according to said calling negotiation information and called negotiation information.

According to this invention, the facsimile machine can transmit negotiation information to and receive negotiation information from the asynchronous digital data network during a data transmission process.

The invention further provides a respective method corresponding to the facsimile machine described in the second aspect.

BRIEF DESCRIPTION OF THE DRAWINGS

The purpose and advantages of this invention will be apparent to those skilled in the art from the following detailed description in conjunction with the appended drawings in which:

FIGS. 3A, 3B, 3C and 3D depict several data communication situations over an asynchronous digital data network, in accordance with Ricoh IDI FAX R-2100 protocol.

FIGS. 4A, 4B and 4C depict several data communication error situations over an asynchronous digital data network in accordance with Ricoh IDI FAX R-2100 protocol.

FIGS. 5A, 5B and 5C depict the command frame formats in Ricoh IDI FAX R-2100 protocol.

FIGS. 10A and 10B depict operation flow charts for a calling and a called facsimile machines in a normal mode, in accordance with the invention.

FIGS. 11A and 11B depict operation flow charts for a calling and a called facsimile machines in a polling mode, in accordance with the invention.

DETAILED DESCRIPTION OF PREFERRED EMBODIMENTS

Figure 1:
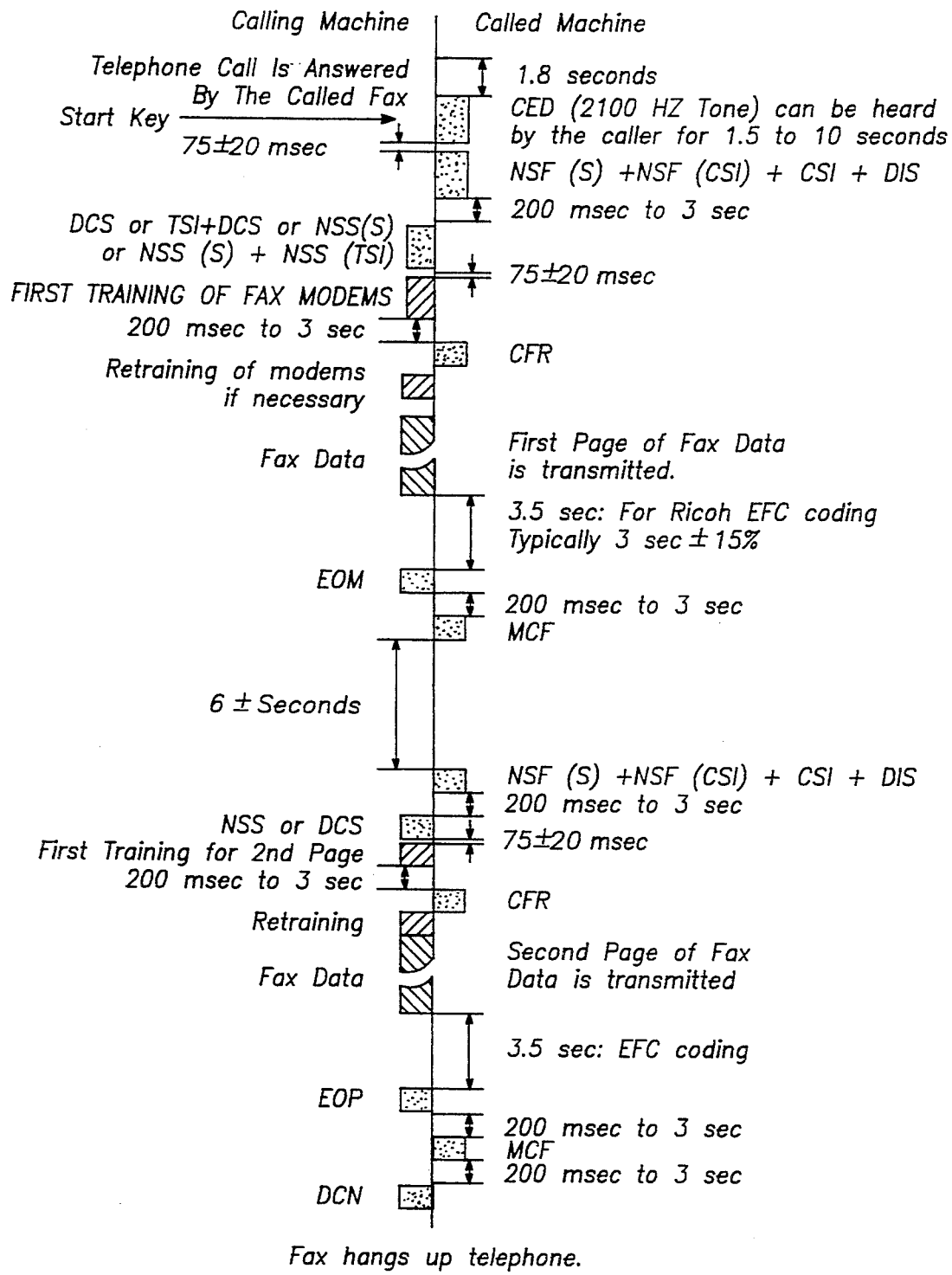
FIG. 1 depicts a typical data communication process over the Public Switched Telephone Network (PSTN), in accordance with the G3 protocol.

This invention comprises a novel facsimile machine and an associated method. The following description is presented to enable any person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, the invention is not intended to be limited to the embodiments shown, but is to be accorded the widest scope consistent with the principles and features disclosed herein.

A. The IDI protocol and R-2100 facsimile machine

To better appreciate this invention, it is helpful first to describe the operation of IDI protocol. Essentially, IDI protocol adds two new commands to the G3 protocol: End of Data Detect (EDT) and Request Next Command (RQN). The IDI protocol also uses two optional commands provided by the G3 protocol: Calling Request (CNG) and Command Repeat (CRP).

To facilitate the description that follows, the major commands used in IDI protocol are as follows:

| Symbol | Hex code | Function |
| --- | --- | --- |
| CNG | 00000001 | Calling Command |
| NSF | 00000010 | Non Standard Facilities |
| NSS | 00000011 | Non standard Setup |
| NSC | 00001011 | Non Standard fac Command |
| EOP | 00000100 | End of Procedure |
| MPS | 00000101 | Multi-Page Signal |
| EOM | 00000110 | End Of Message |
| MCF | 00000111 | Message Confirmation |
| CFR | 00001000 | Confirmation to Receive |
| RTN | 00001001 | Retrain Negative |
| PIN | 00001010 | Procedure Interrupt Neg. |
| EDT | 00001100 | End of page Detection |
| CRP | 00001101 | Command repeat Request |
| RQN | 00001110 | Request Next Command |
| DCN | 10000111 | DisCoNnect message |

In PSTN, the "dialing-and-ring" wakes up the called machine, but in the asynchronous digital data networks, there is no concept of "dialing." Thus, in an asynchronous digital data network, the terminals address each other using ASCII codes, because the asynchronous digital networks were originally designed as computer networks. However, when the IDI protocol was first developed, there were no facsimile machines that had capability to address ASCII codes over asynchronous digital networks. Thus, the IDI protocol uses the CNG frame to wake up a called facsimile machine.

As described above, in synchronous G3 protocol, the transmitting side assumes: (1) the receiver will complete processing a page of fax data within a pre-determined period of time after an EOM command has been transmitted, and (2) the receiver will respond within a pre-determined period of time after the command frame has been transmitted.

For the G3 adaptable facsimile machines, if the receiver side does not respond to a command frame within a pre-determined period of time after the command frame has been transmitted by the transmitting side, the transmitting side typically performs a retry of the command frame.

However, these two assumptions are inapplicable to the asynchronous digital data network, due to the delays caused by the asynchronous digital network hardware and data flow control.

The Ricoh IDI protocol essentially has one-to-one correspondence. That is, for every command frame or data frame, there is a positive acknowledgement. This, in effect, guarantees that the command frame or data frame transmitted has been received correctly, without imposing time penalty on the protocol proceeding.

Since asynchronous network time delays can vary, data transmitted can be received after a variable period of time. Also, network specific data flow control can add further delay time uncertainty. Hence, the transmitter cannot have a fixed time delay period, but rather requires a positive acknowledgement of data received. For example, an average FAX image transmission takes 20 to 25 seconds. The RTC that signals the end of data is embedded at the end of a fax data page. Due to the network delays and network specific flow control, there might be an additional time delay of 1-180 seconds before data reaches the receiver side. If the transmitter always waited blindly for 180 seconds before transmitting the next command frame, much of this wait would be redundant for a network having a time delay less than 180 seconds. Therefore, it would be preferable to have a positive acknowledgement from the receiver signalling RTC detection, whereupon the transmitter could send the next command frame. By adding two new command frames (EDT and RQN) and using one optional command frame (CRP), IDI protocol guarantees a one-to-one correspondence.

According to the IDI protocol, the transmitting or receiving side performs a retry of a command frame only when such retry is requested by the other side. To handle error situations, the IDI protocol uses the CRP frame to initiate a retry of a command frame. For example, if a transmitter sends a command frame to a receiver, and the received command frame is unsatisfactory (either the received command frame was a wrong command frame or a corrupted command frame), the receiver will generate a CRP frame, which requests the transmitter to perform a retry of the command frame. Upon receiving the CRP frame, the transmitting side will perform a retry of the command frame.

According to the IDI protocol, the EDT frame is receiver generated command frame after the receiver has completed processing the received fax data page and has detected the RTC embedded in the received fax data page. By using the EDT command frame, the receiver can inform the transmitter that the processing of received fax data page is completed and the RTC is detected. Upon receiving the EDT command frame, the transmitter will start a post transmission.

The RQN frame is transmitter generated command frame after the transmitter has sent an EOM command frame to a receiver, and the receiver sent back an MCF command frame. Upon receiving the RQN command frame, the receiver will send an NSF command frame to the transmitter.

Unlike the G3 protocol where either a transmitter or a receiver may consecutively transmit two command frames (or a command frame and a data frame), in the IDI protocol, the EDT, RQN and CRP command frames are so arranged to ensure that no two command frames (or a fax data frame and a command frame) are consecutively transmitted from either a transmitter or a receiver. Because time intervals between two consecutive command frames (or fax data frame and a command) can not be assumed in asynchronous digital data networks, the IDI protocol's one-to-one approach is appropriate.

It should be appreciated that with the IDI protocol the time to establish a call in the asynchronous data network is dramatically shorter because the 1.5 to 10 second CED tone is eliminated.

Typically, connect-to-start-of-transmission-times for G3 adaptable facsimile machine in the PSTN system is 8 to 12 seconds. By contrast, typical time for R-2100 facsimile machines to arrive at the point where transmission starts is less than half a second.

Figure 2:
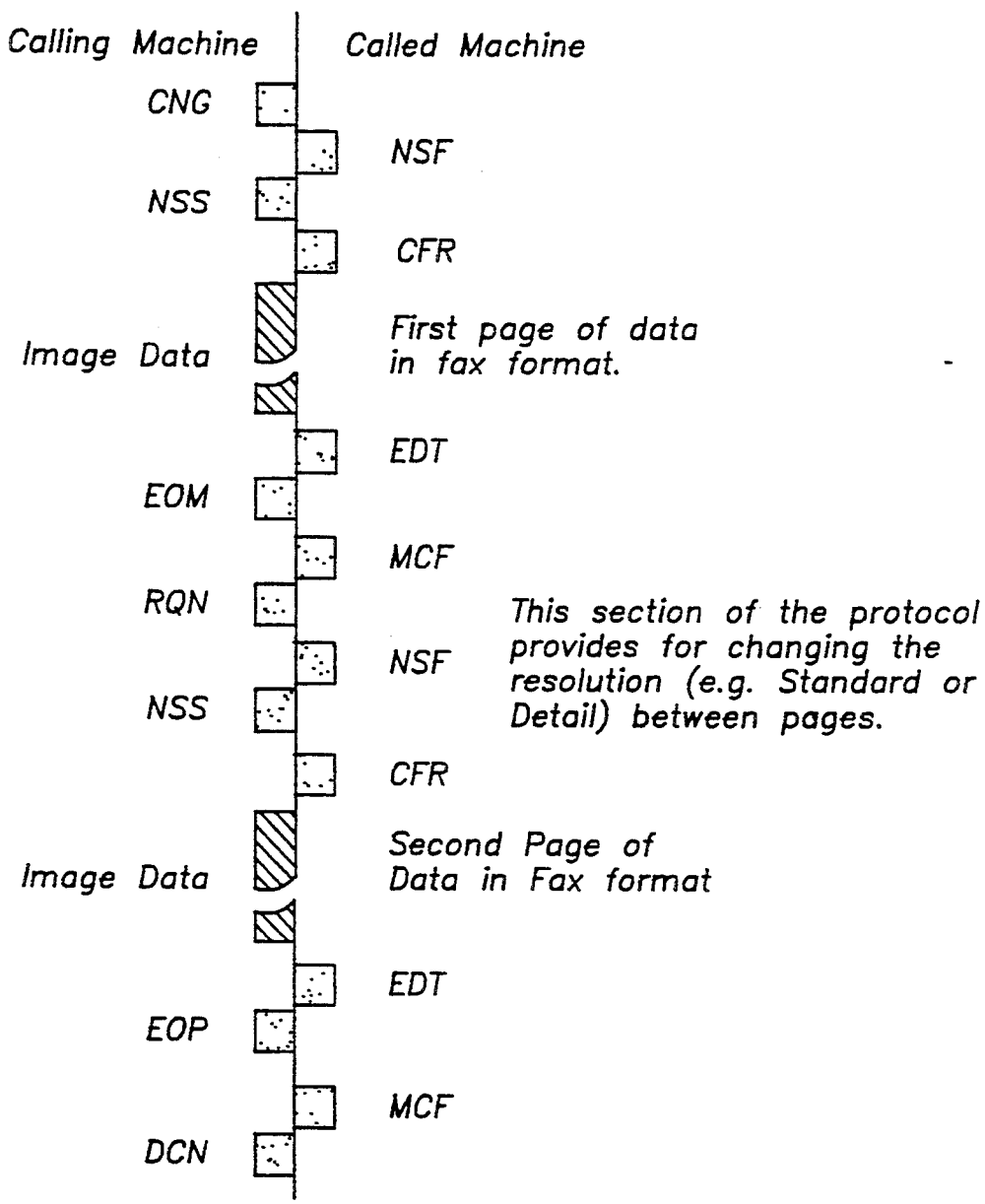
FIG. 2 depicts a typical data communication process over an asynchronous digital data network, in accordance with Ricoh IDI FAX R-2100 protocol.

FIG. 2 depicts a typical R2100 multi-page fax data communication process with parameter changes. The introduction of EDT and RQN command renders the protocol one-to-one, hence making every command respond with a positive acknowledgement. The time period of re-trying a command frame is also preferably increased from 3 seconds in G3 protocol specification to 30 seconds in IDI protocol specification for R2100 facsimile machines.

It should be appreciated that the added EDT (End Detect) command frame is a positive acknowledgement to guarantee a page of fax data getting through the buffering and multiplexing hardware in the asynchronous digital data networks.

FIGS. 3A-3D depict the various R2100 operations in a normal mode and a polling mode. In a normal operation mode, the calling machine is the data transmitter and the called machine is the data receiver. But in a polling operation mode, after initializing a data communication process, the calling machine changes roles and becomes the data receiver. It is the called machine that transmits the data. Hence, if the called machine (A) is set for polling, the calling machine (B) can call machine (A) and request it to send data. Thus, the calling machine B, in effect, becomes the data receiver.

Specifically, FIG. 3A depicts a sequence of events for a data transmission process (a single page of fax data or multiple pages of fax data) in a normal operation mode. The events located above line 1 occur during a connection phase for establishing connection between a calling and a called machines. The events located between lines 1-2 occurs during a data preparation phase for setting suitable image parameters for the first fax data page. The event located between lines 2-3 occurs during a data transmission phase for the first fax data page. The events located below line 3 occur during a post transmission phase. The variations of the events occurring during the post transmission phase depend on: (1) whether subsequent fax data pages exist, and (2) whether the image parameters need to be changed for the subsequent fax data pages.

FIG. 3B depicts a sequence of events for transmitting a subsequent page of fax data with changes of image parameters in a normal operation mode. The events located between lines 3-4 occur during a data preparation phase for the subsequent fax data page. The event located below line 4 occurs in a data transmission phase for the subsequent fax data page.

FIG. 3C depicts a sequence of events for transmitting a subsequent page of fax data without changes of image parameters in a normal operation mode. The events located between lines 3-4 occur during a data preparation phase for the subsequent fax data page. The event located below line 4 occurs in a data transmission phase for the subsequent fax data page.

FIGS. 3D depicts a sequence of events for a data transmission process (a single page of fax data or multiple pages of fax data) in a polling operation mode. The events occurring during the connection phase are the same as these in FIG. 3A. The events located between lines 2-3 occur during a data preparation phase for setting suitable image parameters for a first fax data page. The event located between lines 3-4 occurs in a data transmission phase for the first fax data page. The events located below line 4 occurs during a post transmission phase. Like in the normal operation mode, the variations of the events occurred during the post transmission phase depend on: (1) whether subsequent fax data pages exist, and (2) whether the image parameters need to be changed for the subsequent fax data pages.

FIGS. 4A-4C depict typical IDI protocol Command Repeat sequences. If the calling machine transmits an illegal CNG command frame or the line corrupted the command frame, then the receiver transmits a CRP command frame, requesting the caller to retransmit the last command frame. A maximum of three tries is done before a DCN command frame is transmitted to terminate the transaction.

Specifically, FIG. 4A depicts a situation where a command frame from the called side causes consecutive errors; FIG. 4B depicts a situation where a command from the calling side causes consecutive errors; FIG. 4C depicts a situation where the first CFR causes an error.

B. Negotiation capable IDI protocol and associated facsimile machine

To add negotiation capability to the IDI protocol, this invention encodes negotiation information into the IDI protocol to specify different asynchronous commands. Specifically, the present invention encodes the negotiation information into the CNG, NSF, NSS and NSC command frames of the IDI protocol.

In FIGS. 5A, 5B, 5C, 6, 9, 10A, 10B, 11A and 11C, star symbol "*" located at the left side of a command frame denotes that the command frame contains the encoded negotiation information.

FIG. 5A depicts the frame format for the CNG* frame in accordance with the invention, where fields 8 and 9 provide Machine Identification (MACID). The MACID's function is to provide machine identification that indicates whether the calling machine has negotiation capability. After identifying the calling machine, the called machine provides its capability information by sending out an NSF* frame.

FIG. 5B depicts the frame format for the NSF*, NSS* and NSC* command frames in accordance with the invention. The invention encodes the negotiation information into the FIF field (the eighth field) of the NSF, NSS and NSC command frames of the IDI protocol.

Figure 6:
FIG. 6 depicts the content of facsimile information field (FIF), in accordance with the invention.

FIG. 6 depicts the eight-bit FIF field in detail, in accordance with the invention. The functions of the 0th and 2nd bits are not defined. The 1st bit indicates resolution for the NSF*, NSS* and NSC* command frames. A first bit "0" indicates that the resolution is defined by bit 3, and a "1" indicates the fine resolution, which provides 7.7 lines per mm (vertical) by 3456 picture elements along the horizontal scan line (200 by 400 lines per inch). The 3rd bit indicates resolution for the NSF*, NSS* and NSC* command frames when the first bit is "0". A third-bit "0" indicates STD resolution, and a "1" indicates DTL resolution. The 4th bit indicates paper size for NSF and NSC commands. The 5th bit indicates MMR coding method for the NSF*, NSS* or NSC* command frame. The MMR coding scheme is a modified relative element address designate (read) code. A fifth-bit indicates non-MMR coding, and a "1" indicates MMR coding. The 6th bit indicates operation mode for the NSF* command frame. A sixth-bit "0" value indicates a normal operation mode, and a "1" indicates a polling operation mode. The 7th bit indicates coding method for the NSF*, NSS* and NSC* command frames. A seventh-bit "0" indicates MH coding method, and a "1" indicates MR coding method.

Figure 7:
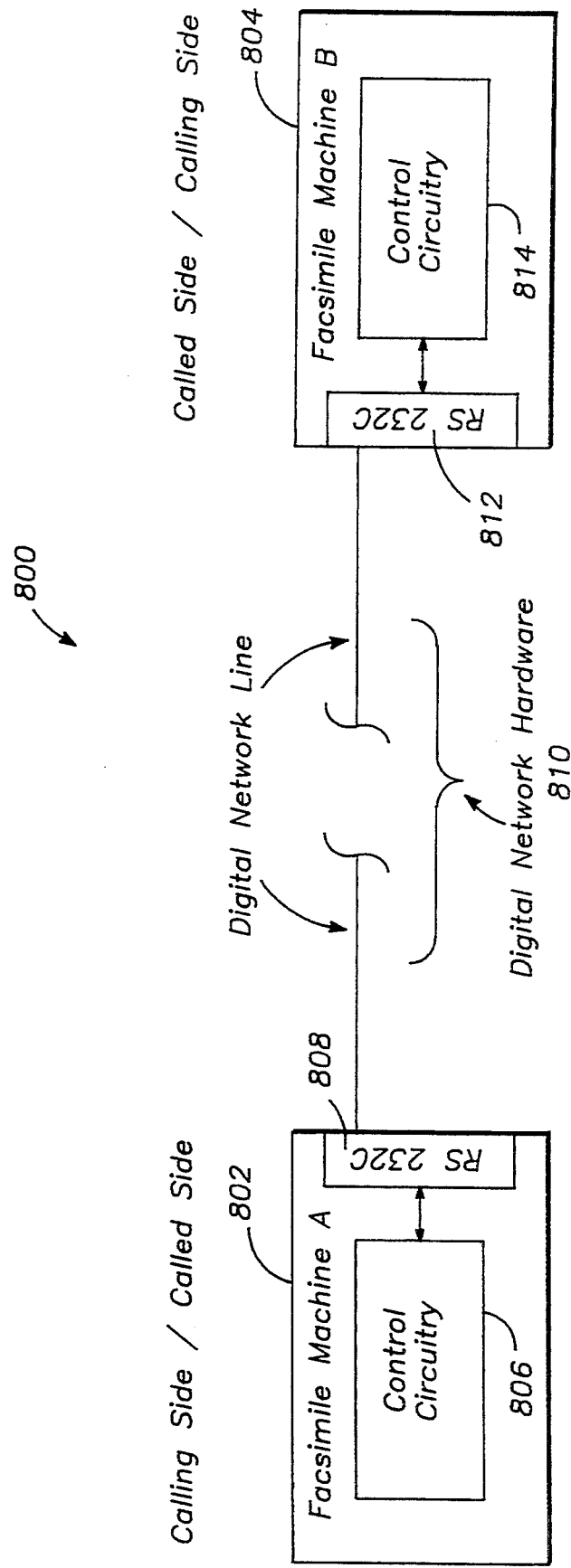
FIG. 7 depicts a facsimile communication system, in accordance with the invention.

FIG. 7 depicts a facsimile communication system wherein a facsimile machine A (802) and a facsimile machine B (804) are coupled to a asynchronous digital data network, in accordance with the invention. The two facsimile machines can communicate with each other over the asynchronous digital network in accordance with the IDI protocol as improved by the invention. Each of the two facsimile machines can act either as a calling terminal (at the calling side) or a called terminal (at the called side).

The facsimile machines A and B include control circuitry 806 and control circuitry 814, and include a serial port 808 and a serial port 804, respectively. The serial ports can be standardized RS 232C serial port.

Initially, the calling side control circuitry generates protocol (including negotiation information) and, the calling side serial port delivers the protocol to the called side serial port. The called side serial port in turn provides the received protocol to the called side control circuitry.

In response to the negotiation information sent by the calling side, the called side control circuitry generates response protocol (including negotiation information). This response protocol is then delivered to the calling side control circuitry via serial ports 812 and 808.

In response to the negotiation information sent by the called side, the calling side control circuitry further generates response protocol (including negotiation information), which is then delivered to the called side control circuitry via serial ports 808 and 812. The negotiation exchanges between the calling and called sides may repeat several times depending on the specific data communication process.

In a normal operation mode, the calling side control circuitry generates image data and sends the image data to the called side control circuitry. The called side control circuitry receives and decodes the image data. By contrast, in a polling operation mode, the called side control circuitry generates image data and sends the image data to the calling side control circuitry. The calling side control circuitry receives and decodes the image data.

Figure 8:
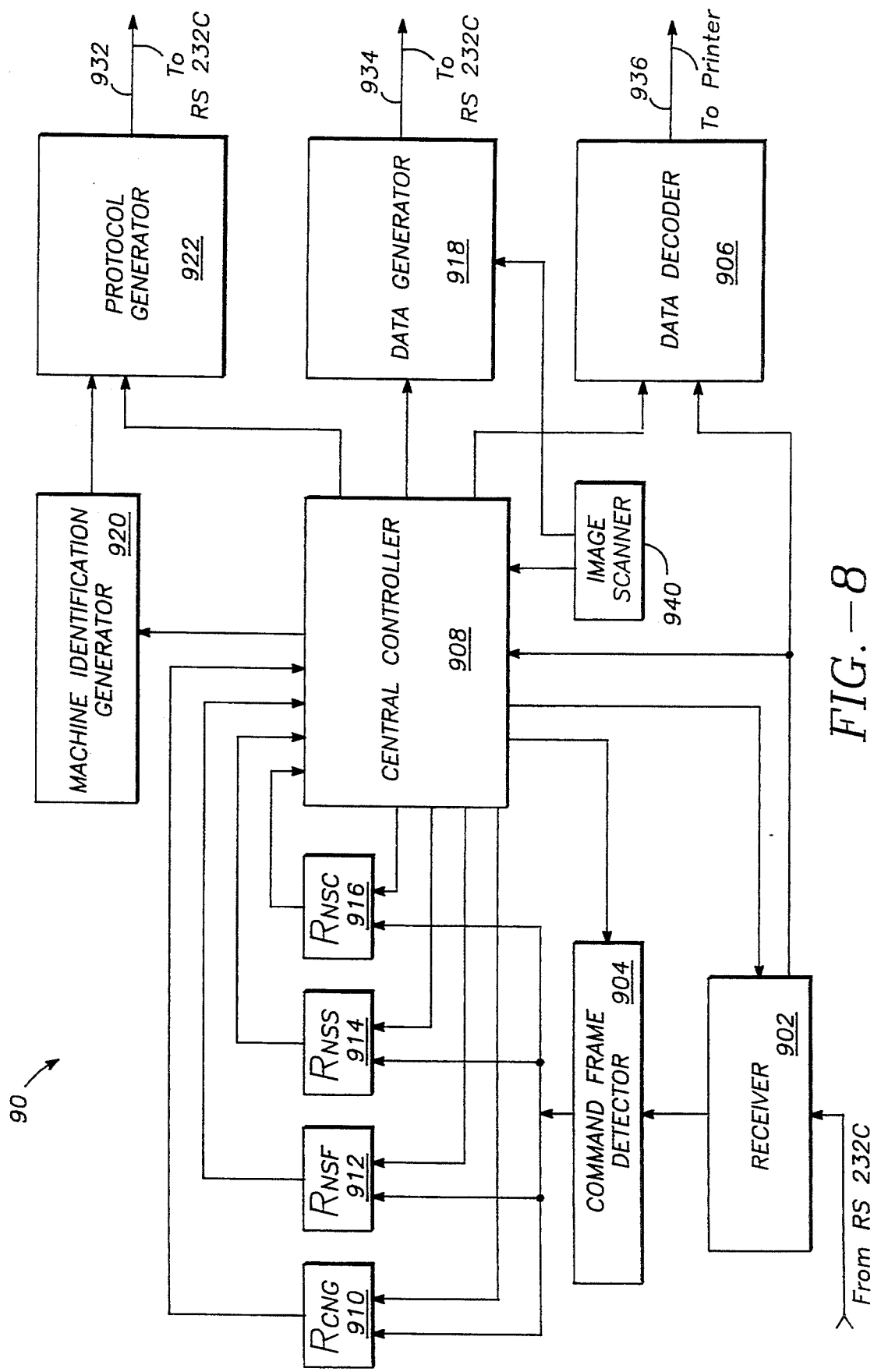
FIG. 8 depicts a block diagram of the control circuitry (806 or 814) shown in FIG. 7, in accordance with the invention.

FIG. 8 depicts control circuitry 806 or 814 in greater detail. The control circuitry includes a receiver 902, a command frame detector 904, four registers (910, 912, 914 and 916), a machine identification generator 920, an protocol generator 922, a data generator 918, a data decoder 906 and a image scanner 940. The control circuitry further includes a central controller 908 that controls over all activities of all the other elements in the control circuitry.

Figure 9:
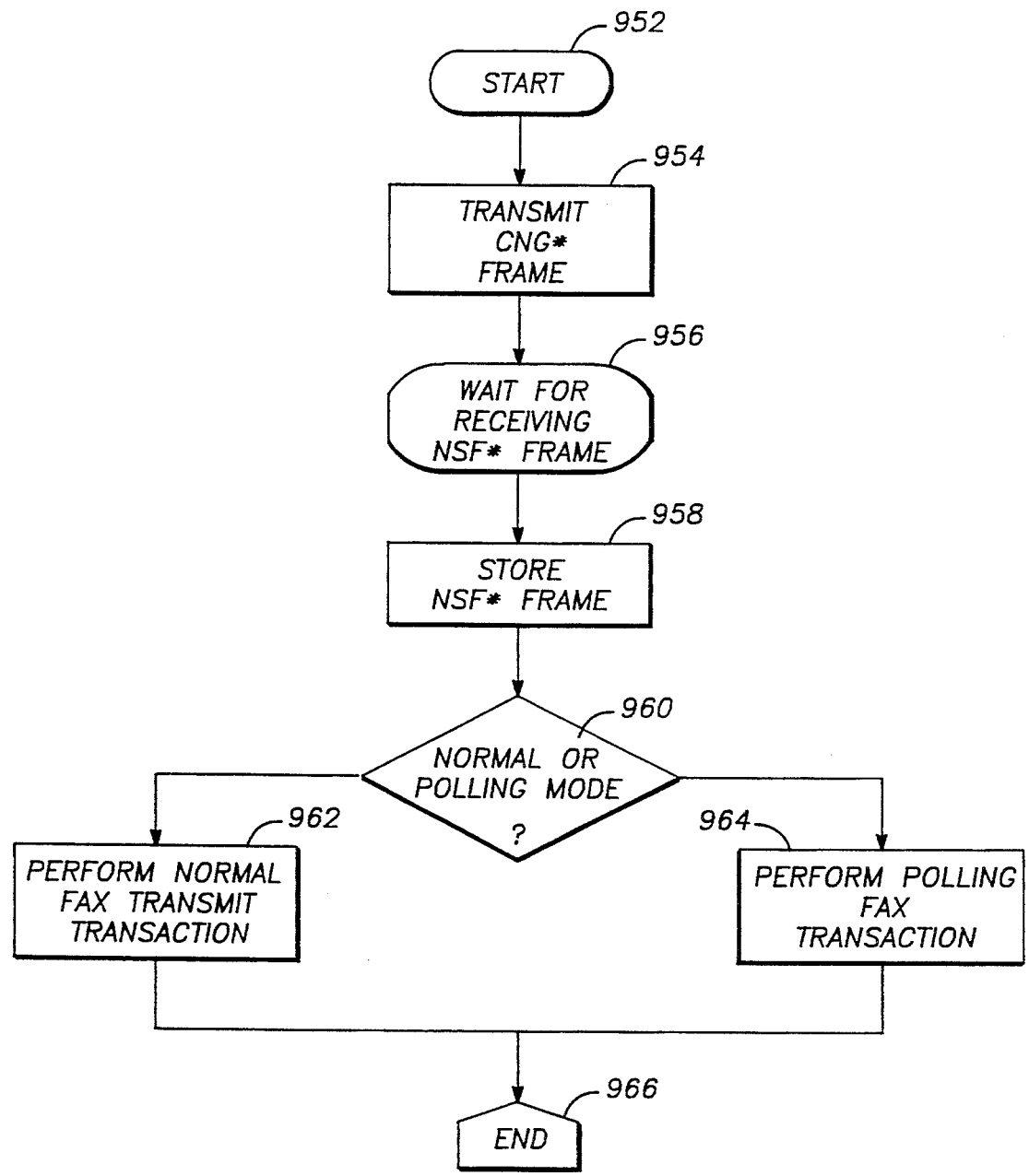
FIG. 9 depicts an operation flow chart for the facsimile machines shown in FIGS. 7 and 8, in accordance with the invention.

The operation of the control circuitry shown in FIG. 9 is as follows: receiver 902 receives signals from RS 232C serial port (808 or 812 shown in FIG. 8), and then provides the received signals to command frame detector 904, central controller 908 and data decoder 906.

Upon receiving signals from receiver 902, command frame detector 904 detects the command frames and extracts the negotiation information encoded in the command frames. While the output from command frame detector is simultaneously coupled to the inputs of the four registers (910, 912, 914 and 916), central controller 908 only activates one register at a specific moment. If a CNG* frame is detected, the command frame detector stores the extracted negotiation information in register $R_{CNG}$ (910). If an NSF* frame is detected, the command frame detector stores the extracted negotiation information in register $R_{NSF}$ (912). If an NSS* frame is detected, the command frame detector stores the extracted negotiation information in register $R_{NSS}$ (914), and if an NSC* frame is detected, the command frame detector stores the extracted negotiation information in register $R_{NSC}$ (916). The outputs of the four registers (910, 912, 914 and 916) are coupled to central controller 908.

Image scanner 940 scans original image printed on medium (such as papers) into one or more pages of digital data, and provides the digital data to data generator 918. Image scanner 940 also provides control information to central controller 908. The control information indicates whether multiple pages of image data are involved, and whether changes of image parameters are needed. Central controller 908 controls protocol generator 922 to generate control commands according to the control information.

Before a data communication process starts, the four registers (910, 912, 914 and 916) at both calling and called sides are set in initial states.

To start a data communication process, central controller 908 at the calling side controls protocol generator 922, data generator 918 and data decoder 906, according to a specific setup at the calling side. Machine identification generator 920 at the calling side generates a pro-determined machine identification. Under the control of central controller 908, protocol generator 922 combines the machine identification into CNG command frame and provides the CNG command frame to RS 232C serial port (808 or 812 shown in FIG. 8).

After the communication process has been started, central controller 908 at both the calling and called sides controls protocol generator 922, data generator 918 and data decoder 906, according to the negotiation information stored in the four registers (910, 912, 914 and 916).

In response to the negotiation information sent from the called side and stored in the four registers (910, 912, 914 and 916), central controller 908 at the calling side controls protocol generator 922 to generate desired protocol (or response protocol), data generator 918 to generate desired data in a normal operation mode, and data decoder 906 to decode data received in a polling operation mode.

In response to the negotiation information sent from the calling side and stored in the four registers (910, 912, 914 and 916), central controller 908 at the called side controls protocol generator 922 to generate desired response protocol; data generator 918 to generate desired data in a polling operation mode; and data decoder 906 to decode data received in a normal operation mode.

To deliver the protocol and image data, outputs of 932 and 934 from protocol generator 932 and data generator 918 are coupled to RS 232C serial port (808 or 812 shown in FIG. 8). To display the received data, the output 936 of data decoder 906 is coupled to a printer (not shown).

FIGS. 9, 10A, 10B, 11A and 11B depicts operation flow charts for the invention. While the calling machine having negotiation capability always transmits an negotiation capability identification to the called machine, it should be appreciated that facsimile machines with negotiation capability according to the invention are compatible with earlier facsimile machines without negotiation capability.

If calling and called machines each have negotiation capability, both machines will generate command frames containing negotiation capability information. As a result, the calling and called machine communicate with each other according to the negotiation capability information.

If the calling machine has negotiation capability and the called machine does not, the called machine will ignore the negotiations capability identification sent by the calling machine. Thus, the called machine cannot generate the command frames containing negotiation capability information. After realizing that the calling machine cannot acknowledge the negotiation capability identification, the calling machine will not generate negotiation information during the data communication process.

In the situation that the calling machine does not have negotiation capability and the called machine has capability, the called machine will not receive the negotiation capability identification from the calling machine. As a result, the called machine will not generate negotiation information during the data communication process.

FIG. 9 depicts a flow chart of data communication operation for a calling and a called machines shown in FIGS. 7 and 8, in accordance with the invention. Step 952 starts the operation. Under the control of the central controller (908 in FIG. 8) and the machine identification generator (920 in FIG. 8), the calling machine (shown in FIG. 7) transmits a CNG* frame to a called machine (shown in FIG. 7) at step 954. At step 956, the calling machine waits for receiving an NSF* command frame sent by the called machine. The NSF* command frame contains the information indicating the capabilities of the called machine. At step 958, the called machine stores the received NSF* command frame in Register $RN_{NSF}$ 912 (shown in FIG. 8). At step 960, the operation tests whether the calling machine is set in a normal operation mode or in a polling operation mode. It should be noted that central controller 908 (shown in FIG. 8) is responsible for setting the calling machine in a specific operation mode. If step 960 determines that the calling machine is set in a normal mode, the operation leads to step 962, in which case the calling machine transmits fax data and the called machine receives the fax data. Step 962 is depicted in further detail in FIGS. 10A and 10B. But if step 960 determines that the calling machine is set in a polling mode, the operation leads to step 964, in which case the called machine transmits fax data and the calling machine receives fax data. Step 964 is described in further detail in FIGS. 11A and 11B. After the fax data have been transmitted by a transmitting side and received by a receiving side, the operation terminates at step 966.

FIG. 10A depicts operation for a calling machine in a normal mode, in accordance with the invention.

After the operation starts at step 1002, the calling machine transmits a CNG* command frame at step 1004. The CNG* frame includes a machine identification (MACID) (shown in FIG. 5A) that indicates whether the calling machine has negotiation capability. At step 1006, the calling machine waits to receive an NSF* frame sent by the called machine. The NSF* frame contains information (shown in FIG. 6) indicating the called machine's capabilities. After the NSF* frame (sent by the called machine) has been received by the receiver (902 in FIG. 8) of the calling machine, the calling machine also stores the NSF* frame in register $R_{NSF}$ (912 in FIG. 8) at step 1006. According to the called machine's capability information stored in $R_{NSF}$, the calling machine transmits an NSS* frame to the called machine at step 1008. The NSS* frame sent by the calling machine contains information (shown in FIG. 6) indicating parameters for the forthcoming fax data. At step 1010, the calling machine waits for receiving a CFR frame sent by the called machine. The reception of the CFR frame confirms that the called machine has successfully received the NSS* frame sent by the calling machine via the asynchronous digital network.

At step 1012, the calling machine transmits a page of fax data to the called machine. At step 1014, the calling machine waits for receiving an EDT frame sent by the called machine. The reception of the EDT frame confirms that the page of fax data has indeed gone through the asynchronous digital network, and has been successfully received by the called machine. At step 1016, the operation for the calling machine tests whether the fax data page being transmitted is the last fax data page. The scanner (940 in FIG. 8) at the data transmitting side detects whether there are more pages of fax data, and provides the central controller (908 in FIG. 8) with the information as to whether there are more pages of fax data. If step 1016 determines that the fax data page being transmitted is not the last fax data page, the operation for the calling machine leads to step 1018 to further test whether the parameters should be changed for the consequent page(s) of fax data. If step 1016 determines that the parameters should be not changed, the operation for the calling machine leads to step 1020 for the calling machine to transmit an MPS command frame. At step 1022, the calling machine waits to receive an MCF frame sent by the called machine. The operation for the calling machine then leads back to step 1012 for the calling machine to transmit a consequent page of fax data without changing the parameters.

But if step 1018 determines that the parameters should be changed, the operation for the calling machine leads to step 1024 for the calling machine to transmit an EOM frame. At step 1026, the calling machine waits to receive an MCF frame sent by the called machine. After receiving the MCF frame, the calling machine transmits a RQN frame at step 1028. The operation for the calling machine then leads to step 1006 to restart the negotiation process, setting new parameters for the subsequent page(s) of fax data. Referring back to step 1016, if the operation for the calling machine determines that the fax data page being transmitted is the last fax data page, the operation for the calling machine leads to step 1030 for the calling machine to send out an EOP frame. At step 1032, the calling machine waits to receive an MCF frame sent by the called machine. After the MCF fame has been received at step 1032, the calling machine transmits a DCN command frame, indicating disconnection of the calling machine. The operation for the calling machine then terminates at step 1036.

FIG. 10B depicts operation for a called machine in a normal mode, in accordance with the invention.

Under control of its central controller (908 shown in FIG. 8), the called machine receives the CNG* frame sent by the calling machine and stores the CNG* frame in register $R_{CNG}$ (910 in FIG. 8) at step 2002. At step 2004, the operation for the called machine tests whether the machine identification (ID) contained in the CNG* frame is "2". If step 2004 determines that the machine ID is not "2" (indicating that the calling machine does not have negotiation capability), the operation for the called machine leads to step 2008 for the called machine to transmit an NSF frame that does not contain negotiation information. But if step 2004 determines that the machine ID is "2" (indicating that the calling machine has negotiation capability), the operation for the called machine leads to step 2006 for the called machine to transmit an NSF* frame that contains the information to indicate the capabilities of the called machine. The called machine then waits to receive an NSS* frame sent by the calling machine. The NSS* frame contains the information (shown in FIG. 6) to indicate the parameters for the forthcoming fax data sent by the calling machine. After the NSS* frame (sent by the calling machine) has been received by the receiver (902 in FIG. 8) of the called machine, the called machine stores the NSS* frame in register $R_{NSS}$ (914 in FIG. 8) at step 2010. The called machine then transmits a CFR frame to the calling machine to confirm reception of the NSS* frame at step 2012, and receives a page of fax data at step 2014. To confirm successful reception of the page of fax data and the detection of the RTC sequence embedded in the page of fax data, the called machine transmits an EDT frame at step 2016. At step 2017, the called machine waits to receive a response from the calling machine. At step 2018, the operation for the called machine tests whether the received response from the calling machine is an MPS, an EOP or an EOM frame.

If step 2018 determines that the received response is an MPS frame, the called machine transmits an MCF frame to the calling machine, confirming reception of post message at step 2020. The operation for the called machine then leads back to step 2014 for the called machine to receive subsequent page(s) of fax data. It should be noted that if the received response is an MPS frame, the calling machine will use the same parameters for the subsequent page(s) of fax data. Thus, there is no need to change parameters for the consequent page(s) of fax data.

If step 2018 determines that the received response is an EOM frame, the operation for the called machine leads to step 2024 for the called machine to transmit an MCF frame to the calling machine, confirming the reception of the post message. At step 2026 the called machine waits to receive a RQN frame from the calling machine, and at step 2022 the called machine transmits an NSF frame to the calling machine. The operation for the called machine then leads back to step 2010 for the called machine to wait to receive an NSS* frame from the calling machine. It should be noted that if the received response is an EOM frame, the calling machine will use different parameters for the consequent page(s) of fax data. Thus, there is a need to change parameters for the consequent page(s) of fax data.

If step 3018 determines that the received response is an EOP frame, the operation for the called machine leads to step 3028 for the called machine to transmit an MCF frame to the calling machine, confirming the reception of the post message. At step 3030 the called machine waits to receive a DCN frame from the calling machine. Upon receipt of the DCN frame, the operation for the called machine terminates at step 3032.

FIGS. 11A depicts the operation of a calling machine in a polling mode, in accordance with the invention.

After the operation has been started at step 3002, the calling machine transmits an CNG* command frame at step 3004. At step 3006, the calling machine waits to receive an NSF* frame sent by the called machine. The called machine confirms the polling operation mode by setting the sixth bit of the FIF field in the NSF* frame to "1." After the NSF* frame (sent by the called machine) has been received by the receiver (902 in FIG. 8) of the calling machine, the calling machine transmits an NSC* frame to the called machine at step 3008, if the calling machine is set for polling. The NSC* frame sent by the calling machine contains information (shown in FIG. 6) to indicate the capabilities of the calling machine. At step 3010, the calling machine waits to receive an NSS* frame sent by the called machine. The NSS* frame sent by the calling machine contains information (shown in FIG. 6) to indicate parameters for the forthcoming fax data. After the NSS* frame (sent by the called machine) has been received by the receiver (902 in FIG. 8) of the calling machine, the calling machine stores the NSS* frame in register $R_{NSS}$ (914 in FIG. 8) at step 3010. The calling machine then transmits a CFR frame to the called machine to conform the reception of the NSS* frame at step 3012, and receives a page of fax data at step 3014. To confirm successful reception of the page of fax data and the detection of the RTC sequence embedded in the page of fax data, the calling machine transmits an EDT frame at step 3016. At step 3017, the calling machine waits to receive a confirming response from the called machine. At step 3018, the operation for the calling machine tests whether the received response from the called machine is an MPS, an EOP or an EOM frame.

If step 3018 determines that the received response is an MPS frame, the calling machine transmits an MCF frame to the called machine, confirming the reception of the post message at step 3020. The operation for the calling machine then leads back to step 3014 for the calling machine to receive subsequent page(s) of fax data. It should be noted that if the received response is an MPS frame, the called machine will use the same parameters for the subsequent page(s) of fax data. Thus, there is no need to change parameters for the consequent page(s) of fax data.

If step 3018 determines that the received response is an EOM frame, the operation for the calling machine leads to step 3024 for the calling machine to transmit an MCF frame to the called machine, confirming the reception of the post message. At step 3026 the calling machine waits to receive a RQN frame from the called machine, and at step 3022 the calling machine transmits an NSF* frame to the called machine. The operation for the calling machine then leads back to step 3010 for the calling machine to wait to receive an NSS* frame from the called machine. It should be noted that if the received response is an EOM frame, the called machine will use different parameters for the consequent page(s) of fax data. Thus, there is a need to change parameters for the consequent page(s) of fax data.

If step 3018 determines that the received response is an EOP frame, the operation for the calling machine leads to step 3028 for the calling machine to transmit an MCF frame to the called machine, confirming the reception of the post message. At step 3030 the calling machine waits to receive a DCN frame from the called machine. Upon receiving the DCN frame, the operation for the calling machine terminates at step 3032.

Figure 11B:
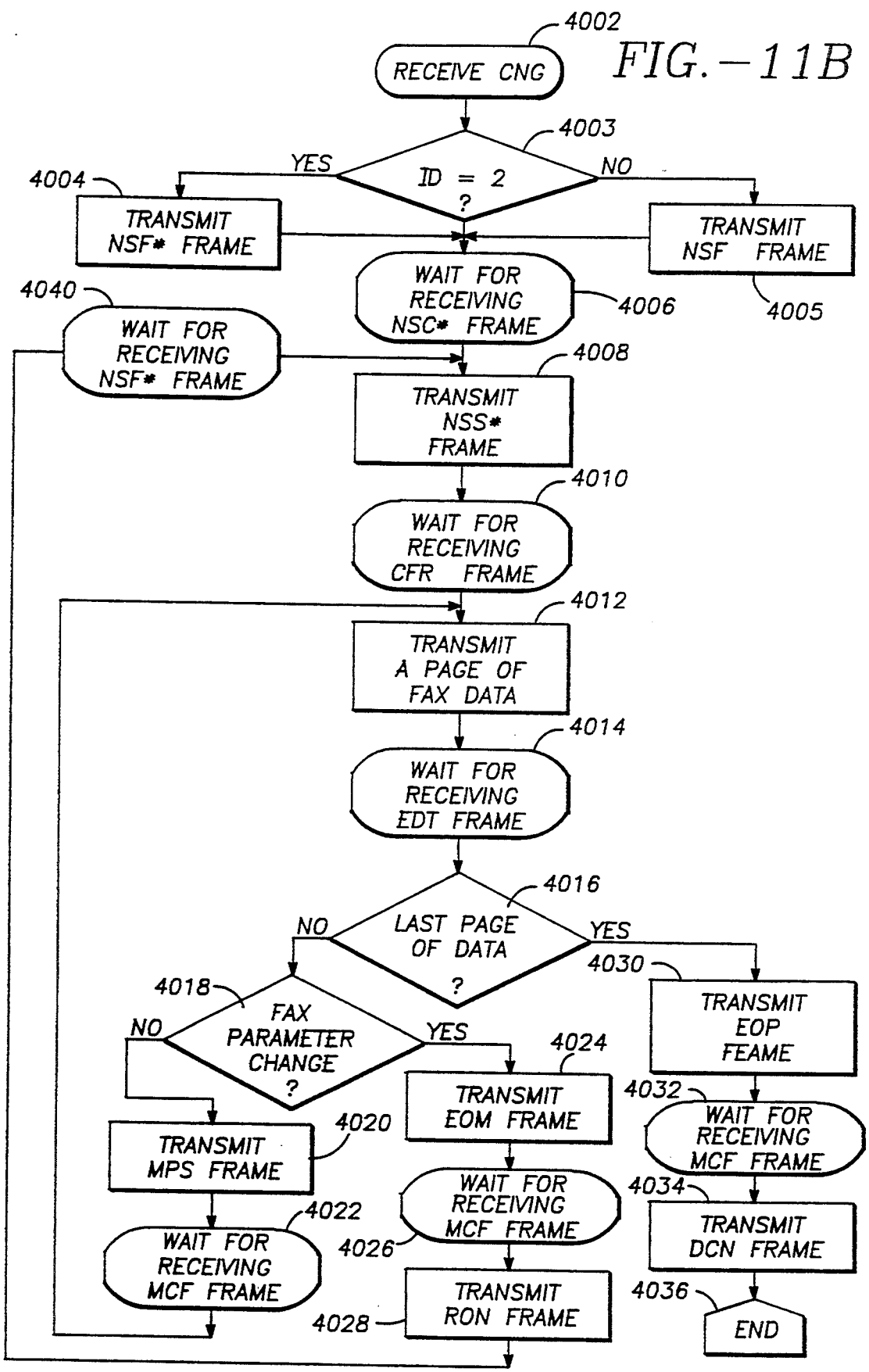

FIGS. 11B depicts the operation of a called machine in a polling mode, in accordance with the invention.

After the called machine receives the CNG* command frame and stores the CNG* command frame in register RCNG 910 (in FIG. 8) at step 4002, the operation tests whether the machine negotiation capability identification (ID) is "2" at step 4003. If the ID is "2", the called machine transmits an NSF* command frame containing negotiation information. The called machine also confirms the polling operation mode by setting the sixth bit of the FIF field in the NSF* command frame to "1". If the ID is not "2", the called machine transmits an NSF command frame without containing negotiation information.

At step 4006, the called machine waits to receive an NSC* frame sent by the calling machine. The NSC* frame contains information (shown in FIG. 6) to indicate the capabilities of the calling machine. After the NSC* frame (sent by the calling machine) has been received by the receiver (902 in FIG. 8) of the called machine, the called machine stores the NSC* frame in register $R_{NSC}$ (916 in FIG. 8) at step 4006. According to the calling machine's capability information stored in $R_{NSC}$, the called machine transmits an NSS* frame to the calling machine at step 4008. The NSS* frame sent by the called machine contains information (shown in FIG. 6) to indicate parameters for the forthcoming fax data. At step 4010, the called machine waits to receive a CFR frame sent by the calling machine. The reception of the CFR frame confirms that the calling machine has successfully received the NSS* frame sent by the called machine via the asynchronous digital network. At step 4012, the called machine transmits a page of fax data to the calling machine. At step 4014, the called machine waits to receive an EDT frame sent by the calling machine. The reception of the EDT frame confirms that the page of fax data has indeed gone through the asynchronous digital network, and has been successfully received by the calling machine. At step 4016, the operation for the called machine tests whether the fax data page being transmitted is the last fax data page.

If step 4016 determines that the fax data page being transmitted is not the last fax data page, the operation for the called machine leads to step 4018 to further test whether the parameters should be changed for the subsequent page(s) of fax data. If step 4016 determines that the parameters should be not changed, the operation for the calling machine leads to step 4020 for the called machine to transmit an MPS frame. At step 4022, the called machine waits to receive an MCF frame sent by the calling machine. The operation for the called machine then leads back to step 4012 to transmit subsequent page(s) of fax data.

But if step 4018 determines that the parameters should be changed, the operation for the called machine leads to step 4024 for the called machine to transmit an EOM frame. At step 4026, the called machine waits to receive an MCF frame sent by the calling machine. After receiving the MCF frame, the called machine transmits a RQN frame at step 4028. At step 4040, the called machine waits to receive an NSF* frame from the calling machine. Upon receiving the NSF* frame, the operation for the called machine leads back to step 4008 for the calling machine to transmit an NSS* frame to set new parameters for subsequent page(s) of fax data.

Referring back to step 4016, if the operation for the called machine determines that the fax data page being transmitted is the last fax data page, the operation for the called machine leads to step 4030 for the called machine to send out an EOP frame. At step 4032, the called machine waits to receive an MCF frame sent by the calling machine. After the MCF fame has been received, the calling machine transmits a DCN frame at step 4034, indicating disconnection of the calling machine. The operation for the called machine then terminates at step 4036.

It should be appreciated that the invention advantageously adds two G4 protocol features to IDI protocol, namely, the fine resolution and MMR coding scheme. The fine resolution provides 7.7 lines per mm (vertical) by 3456 picture elements along the horizontal scan line (200 by 400 lines per inch). The MMR coding scheme is a modified relative element address designate (read) code.

While one particular embodiment of the invention has been described in detail, it will be understood that the invention may be implemented through alternative embodiments. Thus, the scope of the invention is not intended to be limited to the embodiments described above, but is to be defined by the appended claims.

What is claimed is:

1. A method for operating a communication system that includes a calling apparatus and a called apparatus for transmitting data therebetween over an asynchronous digital network during a transmitting process in accordance with a protocol standard, wherein the calling apparatus and the called apparatus generate a plurality of command frames and at least one data frame during the transmitting process, wherein the command and data frames generated by the calling apparatus have a one-to-one correspondence to the command and data frames generated by said called apparatus, said method comprising the steps of:
   exchanging negotiation information contained in a plurality of command frames between the calling apparatus and the called apparatus;
   confirming reception of said command frames;
   transmitting and receiving said at least one data frame according to said negotiation information; and
   confirming reception of each said at least one data frame.

2. The method of claim 1, wherein the protocol standard defines a normal operation mode and a polling operation mode, said method further comprising the step of:
   determining an operation mode for the transmitting process.

3. The method of claim 2, wherein said step of exchanging negotiation information further comprises the step of:
   in the normal operation mode, the called apparatus transmits a command frame containing parameters indicating capabilities of the called apparatus.

4. The method of claim 3, wherein said capability indicating parameters indicate whether said called apparatus can be polled.

5. The method of claim 3, wherein said step of exchanging negotiation information further comprises the step of:
   in the normal operation mode, the calling apparatus transmits a command frame containing indicating data type of a forthcoming data frame.

6. The method of claim 5, wherein said parameters of indicating data type indicates data compression methods and image resolutions.

7. The method of claim 5, wherein said step of exchanging negotiation information further comprises the step of:
   in the normal operation mode, the calling apparatus transmits a command frame containing apparatus identification.

8. The method of claim 7, wherein said apparatus identification contains information indicating whether the calling apparatus has negotiation capabilities.

9. The method of claim 5, further comprising the steps of:
   determining whether subsequent data frames exist;
   determining whether image parameters for said subsequent data frames need to be changed; and
   changing said image parameters for said subsequent data frames;
   wherein said step of exchanging negotiation information further comprises the step of exchanging said changed parameters for said subsequent data frames.

10. The method of claim 9, wherein said capability indicating parameters indicate whether said called apparatus can be polled.

11. The method of claim 10, wherein said step of exchanging negotiation information further comprises the step of:
   in the polling operation mode, the calling apparatus transmits a command frame containing parameters indicating capabilities of said calling apparatus.

12. The method of claim 11, wherein said step of exchanging negotiation information further comprises the step of:
   in the polling operation mode, the called apparatus transmits a command frame containing parameters indicating data type of a forthcoming data frame.

13. The method of claim 12, wherein said step of exchanging negotiation information further comprises the step of:
   in the polling operation mode, the calling apparatus transmits a command frame containing apparatus identification.

14. The method of claim 12, wherein said parameters of indicating data type indicate data compression methods and image resolutions.

15. A communication system that includes a calling apparatus and a called apparatus for transmitting data therebetween over an asynchronous digital network during a transmitting process in accordance with a protocol standard, wherein the calling apparatus and the called apparatus generate a plurality of command frames and at least one data frame during the transmitting process, wherein the command and data frames generated by the calling apparatus have a one-to-one correspondence to the command and data frames generated by said called apparatus, said system comprising:
   means for exchanging negotiation information contained in a plurality of command frames between the calling apparatus and the called apparatus;
   means for confirming reception of said command frames;
   means for transmitting and receiving said at least one data frame according to said negotiation information; and
   means for confirming reception of each said at least one data frame.

16. The system of claim 15, wherein the protocol standard defines a normal operation mode and a polling operation mode, said system further comprises:
   means for determining an operation mode for the transmitting process.

17. The system of claim 16, wherein said means for exchanging negotiation information further comprises:
   in the normal operation mode, means for transmitting a command frame from the called apparatus, said command frame containing parameters indicating capabilities of the called apparatus.

18. The system of claim 17, wherein said capability indicating parameters indicate whether said called apparatus can be polled.

19. The system of claim 17, wherein said means for exchanging negotiation information further comprises:
   in the normal operation mode, means for transmitting a command frame from the calling apparatus, said command frame containing indicating data type of a forthcoming data frame.

20. The system of claim 19, wherein said parameters of indicating data type indicates data compression methods and image resolutions.

21. The system of claim 19, wherein said means for exchanging negotiation information further comprises:
in the normal operation mode, means for transmitting a command frame from the calling apparatus, said command frame containing apparatus identification.

22. The system of claim 21, wherein said apparatus identification contains information indicating whether the calling apparatus has negotiation capabilities.

23. The system of claim 19, further comprising:
means for determining whether subsequent data frames exist;
means for determining whether image parameters for said subsequent data frames need to be changed; and
means for changing said image parameters for said subsequent data frames;
wherein said means for exchanging negotiation information further comprises means for exchanging said changed parameters for said subsequent data frames.

24. The system of claim 23, wherein said capability indicating parameters indicate whether said called apparatus can be polled.

25. The system of claim 24, wherein said means for exchanging negotiation information further comprises:
in the polling operation mode, means for transmitting a command frame from the calling apparatus, said command frame containing parameters indicating capabilities of said calling apparatus.

26. The system of claim 25, wherein said means for exchanging negotiation information further comprises:
in the polling operation mode, means for transmitting a command frame from the called apparatus, said command frame containing parameters indicating data type of a forthcoming data frame.

27. The system of claim 26, wherein said means for exchanging negotiation information further comprises:
in the polling operation mode, means for transmitting a command frame from the calling apparatus, said command frame containing apparatus identification.

28. The system of claim 26, wherein said parameters of indicating data type indicate data compression methods and image resolutions.

29. A method used with a facsimile machine for transmitting and receiving data over an asynchronous digital network during a data transmitting process in accordance with a protocol standard, said method comprising the steps of:
transmitting calling negotiation information to a called facsimile machine;
receiving called negotiation information from said called facsimile machine;
decoding said called negotiation information; and
performing the data transmitting process according to said calling negotiation information and said called negotiation information.

30. The method of claim 29, wherein the protocol standard defines a normal operation mode and a polling operation mode, said method further comprising the step of:
determining an operation mode for the transmitting process.

31. The method of claim 30, wherein said step of transmitting calling negotiation information further comprises the step of:
in the normal operation mode, transmitting a command frame containing indicating data type of a forthcoming data frame.

32. The method of claim 31, wherein in the normal operation mode said step of performing the data transmitting process comprises the step of:
transmitting the data frame to said called facsimile machine according to said calling and called negotiation information.

33. The method of claim 31, wherein said step of receiving called negotiation information from said called facsimile machine further comprises the step of:
in the normal operation mode, receiving a command frame from said called facsimile machine, said frame containing parameters indicating capabilities of the called facsimile machine.

34. The method of claim 33, wherein said capability indicating parameters indicate whether said called facsimile machine can be polled.

35. The method of claim 33, wherein said step of transmitting calling negotiation information further comprises the step of:
in the normal operation mode, transmitting a command frame containing machine identification to indicate whether the facsimile machine has negotiation capabilities.

36. The method of claim 33, said step of transmitting calling negotiation information further comprising the steps of:
transmitting calling negotiation information as to whether subsequent data frames exist;
transmitting calling negotiation information as to whether image parameters for said subsequent data frames need to be changed; and transmitting the data to said called facsimile machine.

37. The method of claim 30, wherein said step of receiving called negotiation information further comprises the step of:
in the normal operation mode, receiving a command frame from said called facsimile machine, said command frame containing parameters indicating capabilities of the called facsimile machine.

38. The method of claim 37, wherein said capability indicating parameters indicate whether said called facsimile machine can be polled.

39. The method of claim 30, wherein said step of transmitting negotiation information further comprises the step of:
in the polling operation mode, the facsimile machine transmitting a command frame containing parameters indicating capabilities of said facsimile machine.

40. The method of claim 39, wherein said step of receiving called negotiation information further comprises the step of:
in the polling operation mode, the facsimile machine receiving a command frame from said called facsimile machine, said command frame containing parameters indicating data type of a forthcoming data frame.

41. The method of claim 40, wherein said step of transmitting called negotiation information further comprises the step of:

in the polling operation mode, the facsimile machine transmitting a command frame containing machine identification.

42. The method of claim 40, wherein in the normal operation mode said step of performing the data transmitting process comprises the step of:
receiving a data frame from said called facsimile machine according to said calling and called negotiation information.

43. The method of claim 40, wherein said step of receiving called negotiation information further comprising the steps of:
receiving called negotiation information as to whether subsequent data frames exist;
receiving called negotiation information as to whether image parameters for said subsequent data frames need to be changed; and
receiving the subsequent data frames from said called facsimile machine.

44. A facsimile machine for transmitting and receiving data over an asynchronous digital network during a data transmitting process in accordance with a protocol standard, said facsimile machine comprising:
means for transmitting calling negotiation information to a called facsimile machine;
means for receiving called negotiation information from said called facsimile machine;
means for decoding said called negotiation information; and
means for performing the data transmitting process according to said calling negotiation information and said called negotiation information.

45. The facsimile machine of claim 44, wherein the protocol standard defines a normal operation mode and a polling operation mode, said machine further comprises:
means for determining an operation mode for the transmitting process.

46. The facsimile machine of claim 45, wherein said means for transmitting calling negotiation information further comprises:
means for transmitting a command frame indicating data type of a forthcoming data frame in the normal operation mode.

47. The facsimile machine of claim 46, wherein in the normal operation mode said means for performing the data transmitting process comprises:
means for transmitting a data frame to said called facsimile machine according to said calling and called negotiation information.

48. The facsimile machine of claim 46, wherein said means for receiving called negotiation information from said called facsimile machine further comprises:
means for receiving a command frame from said called facsimile machine, said frame containing parameters indicating capabilities of the called facsimile machine in the normal operation mode.

49. The facsimile machine of claim 48, wherein said capability indicating parameters indicate whether said called facsimile machine can be polled.

50. The facsimile machine of claim 48, wherein said means for transmitting calling negotiation information further comprises:
means for transmitting a command frame containing machine identification to indicate whether the facsimile machine has negotiation capabilities in the normal operation mode.

51. The facsimile machine of claim 48, said means for transmitting calling negotiation information further comprises:
means for transmitting calling negotiation information as to whether subsequent data frames exist;
means for transmitting calling negotiation information as to whether image parameters for said subsequent data frames need to be changed; and
means for transmitting the subsequent data frames to said called facsimile machine.

52. The facsimile machine of claim 45, wherein said means for receiving called negotiation information further comprises:
means for receiving a command frame from said called facsimile machine, said command frame containing parameters indicating capabilities of the called facsimile machine in the normal operation mode.

53. The facsimile machine of claim 52, wherein said capability indicating parameters indicate whether said called facsimile machine can be polled.

54. The facsimile machine of claim 45, wherein said means for transmitting calling negotiation information further comprises:
means for transmitting a command frame containing parameters indicating capabilities of said facsimile machine in the polling operation mode.

55. The facsimile machine of claim 54, wherein said means for receiving called negotiation information further comprises:
means for receiving a command frame from said called facsimile machine, said command frame containing parameters indicating data type of a forthcoming data frame in the polling operation mode.

56. The facsimile machine of claim 55, wherein said means for transmitting calling negotiation information further comprises:
means for transmitting a command frame containing machine identification in the polling operation mode.

57. The facsimile machine of claim 55, wherein in the normal operation mode said means for performing the data transmitting process comprises:
means for receiving the data from said called facsimile machine according to said calling and called negotiation information.

58. The facsimile machine of claim 55, wherein said means for receiving called negotiation information further comprises:
means for receiving called negotiation information as to whether subsequent data frames exist;
means for receiving called negotiation information as to whether image parameters for said subsequent data frames need to be changed; and
means for receiving the subsequent data frames from said called facsimile machine.

* * * * *